US010530278B1

(12) United States Patent
Liu et al.

(10) Patent No.: US 10,530,278 B1
(45) Date of Patent: Jan. 7, 2020

(54) METHOD TO REDUCE TORQUE RIPPLE OF PERMANENT MAGNET SYNCHRONOUS MOTOR

(71) Applicant: Jiangsu University, Zhenjiang, Jiangsu (CN)

(72) Inventors: Guohai Liu, Jiangsu (CN); Xinxin Du, Jiangsu (CN); Wenxiang Zhao, Jiangsu (CN); Qian Chen, Jiangsu (CN); Deshui Hu, Jiangsu (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 99 days.

(21) Appl. No.: 15/772,433

(22) PCT Filed: Feb. 6, 2017

(86) PCT No.: PCT/CN2017/072924
§ 371 (c)(1),
(2) Date: Apr. 30, 2018

(87) PCT Pub. No.: WO2018/098902
PCT Pub. Date: Jun. 7, 2018

(30) Foreign Application Priority Data

Nov. 29, 2016 (CN) .......................... 2016 1 1066962

(51) Int. Cl.
*H02P 6/10* (2006.01)
(52) U.S. Cl.
CPC ..................................... *H02P 6/10* (2013.01)
(58) Field of Classification Search
CPC ........................................................ H02P 6/10
(Continued)

(56) References Cited

U.S. PATENT DOCUMENTS 6,498,449 B1 * 12/2002 Chen ..................... B62D 5/046
318/434
7,005,822 B1 * 2/2006 O'Gorman ................ H02P 6/10
318/608

(Continued)

FOREIGN PATENT DOCUMENTS

CN           105337550 A        2/2016
KR       1020090015709 A        2/2009

OTHER PUBLICATIONS

Liu et al., Reducing Cogging Torque in Permanent Magnet Wind Power Generators Based on Repeat Unit, Transactions of China Electrotechnical Society, Dec. 2011, pp. 43-48, vol. 26, No. 12.

(Continued)

*Primary Examiner* — Bentsu Ro
(74) *Attorney, Agent, or Firm* — TraskBritt

(57) ABSTRACT

A method named as Magnet Shifting to reduce torque ripple of permanent magnet synchronous motor is disclosed. A way of reasonably choosing the repeating unit of magnetic pole, the shifting ways and the shifting angle calculation of the first and second magnet shifting is described, which are carried on the repeating unit of magnetic poles individually or repeatedly to improve the performance of the motor. The method can be applied to surface, surface-inset and inner-embedded permanent magnet motors, which can reduce torque ripple caused by different torque components, including cogging torque, reluctance torque or permanent magnet torque. It also can quickly calculate the shifting angle of the magnetic pole by choosing repeating unit reasonably. Magnet shifting can effectively enhance the sinusoidal degree of back electrodynamic force (back-EMF) waveform, where the repeating units can offset the torque ripple between the maximum and the minimum value to reduce the different torque harmonics. Also, the output torque can be maintained (Continued)

nearly to the original value while less vibration noise of the motor is inevitably introduced.

20 Claims, 7 Drawing Sheets

(58) Field of Classification Search
USPC .......................................................... 318/629
See application file for complete search history.

(56) References Cited

U.S. PATENT DOCUMENTS

| 2002/0053891 | A1* | 5/2002 | Lee | H02P 27/08 |
| | | | | 318/432 |
| 2005/0201129 | A1* | 9/2005 | Nakatsugawa | H02P 6/10 |
| | | | | 363/131 |
| 2009/0267555 | A1* | 10/2009 | Schulz | H02P 29/50 |
| | | | | 318/432 |
| 2018/0097461 | A1* | 4/2018 | Ballal | H02P 6/10 |

OTHER PUBLICATIONS

Lai et al., Magnet Shifting in Built-in Single-phase Permanent Magnet Synchronous Motor Base on Repeat Unit, Abstract in English, Micromotors, Aug. 2015, DOI:10.15934/j.cnki. micromotors, Aug. 1, 2015.
Chinese First Office Action for Chinese Application No. 201611066962. 2, dated Jun. 28, 2018, 8 pages with English Translation.

* cited by examiner

METHOD TO REDUCE TORQUE RIPPLE OF PERMANENT MAGNET SYNCHRONOUS MOTOR

CROSS-REFERENCE TO RELATED APPLICATIONS

This application is a national phase entry under 35 U.S.C. § 371 of International Patent Application PCT/CN2017/072924, filed Feb. 6, 2017, designating the United States of America, which claims the benefit under Article 8 of the Patent Cooperation Treaty to Chinese Patent Application Serial No. 201611066962.2, filed Nov. 29, 2016.

TECHNICAL FIELD

The application relates to the technology of permanent magnet synchronous motors, in particular, for reducing torque ripple of permanent magnet synchronous motors, which belongs to the field of motor manufacturing.

BACKGROUND

Permanent magnet synchronous motors have been widely used in various occasions due to their high efficiency and high torque density. Meanwhile, permanent magnet synchronous motors utilize magnetic material with high magnetic energy, instead of traditional excitation winding. This not only avoids the negative effects resulting from traditional excitation winding, but also simplifies the mechanical structure of the motor, which improves the reliability of the motor and reduces the mechanical loss.

Some demanding applications need smooth output torque and high operating stability, such as an electric steering system and servo motor. That is, torque ripple of the motor should be maintained as small as possible, so as to achieve a smooth and accurate thrust drive. However, due to the concavity and convexity of motor structure and the coupling effect of magnetic field, permanent magnet synchronous motors suffer from relatively large torque ripple, which limits the application of these motors. Therefore, it is greatly significant to study the torque ripple suppression strategy for these motors, thus improving the smoothness of the torque.

In order to reduce the torque ripple, various methods have been proposed. Generally, these methods can be classified into three main strategies: involving stator slots and teeth, windings and rotor magnets. First, skewing is widely used to reduce torque ripple, in which the stator slots or rotor poles are skewed to reduce the cogging torque. However, the skewed stator or rotor is harder to build as for manufacturing, which also increases the cost of production. Then, the auxiliary slots or teeth are used to replace the skewing to avoid the disadvantages from skewing at the loss of efficiency. Moreover, optimization of the slot or slot-opening is also used to reduce torque ripple. Second, due to the influence between the stator winding and the cogging torque, the stator magnetic modification has been proposed to minimize the ripple, such as fractional-slot pitch windings. However, the odd and even magnetomotive force harmonics are incorporated in those windings. This means that the improper selection of the fractional slot can lead to the vibration of the stator core. Also, these methods pay much attention to reduction of torque ripple but ignore loss of output torque. Therefore, how to maintain torque density and minimize torque ripple at the same time is one key research direction.

In addition, optimization of magnets has been developed as one of the effective methods, such as reshaping magnets, using different magnet widths and asymmetry magnets. These studies result in asymmetric magnets or change the distribution of magnets by poles shifting or other methods. However, these methods only consider the reduction for cogging torque while ignoring the effects of reluctance torque on torque smoothness in inset and interior permanent magnet synchronous motors. Sometimes in inset or interior motors, the cogging torque occupies a very small proportion in the total torque ripple because of the existence of the reluctance torque. The total torque ripple was not always reduced effectively with an acceptable torque loss by the conventional magnet shifting. Therefore, how to reduce the main source of torque ripple quickly and effectively is another key research direction.

BRIEF SUMMARY

The disclosure notably describes a method to reduce total torque ripple and maintain torque density at the same time by magnets shifting. On the basis of accurately analyzing source of torque ripple, this method is realized by reasonably choosing a repeating unit that indicates a group of poles producing torques with consistency in waveform and phase. Under the premise of reducing torque ripple effectively, comprehensive consideration of permanent magnet torque and reluctance torque is helpful to weaken the effect of asymmetric rotor on output torque, vibration and noise of motor.

The technical scheme of the disclosure is the method to reduce torque ripple of permanent magnet synchronous motors, including the following steps:

Step one: Torque of target motor with different combination between poles and slots is analyzed. According to the relationship between the pole number and slot number, the fluctuation period number of torque ripple in one electric cycle is calculated to determine the general trend of its fluctuation.

Step two: The rotor and magnets of the motor are modularized by calculating the minimum number of magnetic poles ($N_0$) in each module. Through modular analysis, the magnetic poles in each module can produce the same torque with consistency in waveform and phase. Then, each module containing the fewest magnetic poles is recognized as one basic repeating unit.

Step three: Two or more of basic repeating units can be merged to form a new repeating unit, which can also produce the same torque with consistency in waveform and phase. A different number of new repeating units has an effect on magnet shifting.

Step four: The main source of torque and torque ripple are analyzed, and their generation is modularized and analyzed. The basic repeating unit to produce the main source of torque and torque ripple is determined, and the minimum pole number ($N_{i0}$) in each basic repeating unit is calculated.

Step five: Considering the $N_0$ and $N_{i0}$ comprehensively, a reasonable repeating unit is chosen to shift. According to the number of poles (b) in the selected repeating unit, the number of repeating units (q) and the maximum shifting times (N) are determined respectively.

Step six: In order to weaken the first main harmonic of torque ripple, the accurate angle ($\theta_1$) of magnet shifting for the first time is calculated, and the selected repeating unit is shifted anti-clockwise by $\theta_1$ degrees. The selected repeating unit is named "first repeating unit," and the first application is recognized as "first magnet shifting."

Step seven: In order to weaken the second main harmonic of torque ripple, the accurate angle ($\theta_2$) of magnet shifting for the second time is calculated. Based on the first magnet shifting, a new repeating unit is reconsidered, formed, and then shifted by $\theta_2$ degrees. The new repeating unit is named "second repeating unit," and the second application is recognized as "second magnet shifting."

Step eight: If motor structure is allowed, the accurate angle ($\theta_n$) of magnet shifting for the $n^{th}$ time is calculated to weaken the $n^{th}$ order main harmonic of torque ripple. On the basis of the $(n-1)^{th}$ magnet shifting, a new repeating unit is reconsidered for the $n^{th}$ time and then shifted by $\theta_n$ degrees. The newest repeating unit is named "$n^{th}$ repeating unit."

Further, in Step one, the fluctuation period number of torque ripple in one electric cycle is calculated by $$T_{ripple} = \frac{N_{ps}}{N_p},$$

where $T_{ripple}$ is the fluctuation period number of torque ripple in one electric cycle, $N_s$ is the slot number, $N_p$ is the pole-pair number, and $N_{ps}$ is the least common multiple of slot number ($N_s$) and pole number ($2N_p$), $N_{ps}$=LCM($N_s$, $2N_p$).

Further, in Step two, the basic repeating unit indicates a group of poles producing the same torques with consistency in waveforms and phases.

Further, in Step two, the minimum number of magnetic poles ($N_0$) in each basic repeating unit is calculated by $$N_0 = \frac{N_{ps}}{N_s},$$

where $N_0$ is the minimum number of magnetic poles in each basic repeating unit, and $N_s$ is the slot number.

Further, in Step three, the new repeating unit is combined with k basic repeating units and the number of magnetic poles in the new basic repeating unit is $kN_0$.

Further, in Step four, the main source of torque ripple may be involved in cogging torque, reluctance torque and permanent magnet torque. Their minimum numbers of magnetic poles ($N_0$) in each basic repeating unit are marked as $N_{10}$, $N_{20}$, $N_{30}$, respectively.

Further, in Step five, the number of poles (b) in the selected repeating unit, the number of repeating units (q) and the maximum shifting times (N) are respectively determined by 1) $\begin{cases} b = kN_0 \\ b_{max} \leq N_p \end{cases}$, k belongs to integer.

2) $q = \frac{2N_p}{b}$.  3) $N = \log_2\left(\frac{2N_p}{b}\right)$,

N belongs to integer.

When the number of poles (b) in the selected repeating unit, the number of repeating units (q) and the maximum shifting times (N) in Step five are determined, the total torque can be composed of partial torque produced by each repeating unit. That is $$T = \sum_{i=1}^{q} T_i,$$

where $T_i$ is torque produced by the $i^{th}$ repeating unit.

Further, in Step six, wherein the accurate angle ($\theta_n$) of magnet shifting for the $n^{th}$ time are calculated by Step 6.1, the torque expression of the motor can be expressed as the sum of the average torque and torque ripple, which is as follows:

$$\begin{cases} T = T_{all\_av} + T_{all\_rip} \\ T_{all\_rip} = \sum_{n=1}^{\infty} T_m \sin N_{ps} n\alpha = q \sum_{n=1}^{\infty} T_{pm} \sin N_{ps} n\alpha \end{cases}$$

where the $T_{all\_av}$ represents the average torque and the $T_{all\_rip}$ represents the torque ripple. According to the periodicity of torque ripple, it can be expressed as the form of the Fourier series.

Step 6.2, the torque T of a motor can be expressed as the sum of the partial torque component $T_i$ produced by the $i^{th}$ repeating unit. And the partial torque component $T_i$ can also be expressed as the sum of the corresponding partial average value component and the corresponding partial torque ripple. When one repeating unit is shifted by $\theta$ degrees, the corresponding partial torque ripple produced by the shifted repeating unit changes only in phase. That is $$T'_{rip} = \sum_{n=1}^{\infty} T_{pm} \sin N_{ps} n(\alpha + \theta)$$

Step 6.3, the total torque ripple is superposed by the torque ripple produced by shifted repeating units and that of fixed repeated units:

$$T_{all\_rip} = \frac{q}{2} \sum_{j=1}^{2} \sum_{n=1}^{\infty} T_{prjn} \sin N_{ps} n(\alpha + (j-1)\theta)$$

Step 6.4, based on these, the output torque can be further expressed as $$T = \frac{q}{2} \sum_{j=1}^{2} \left( T_{pavj} + \sum_{n=1}^{\infty} T_{prjn} \sin N_{ps} n(\alpha + (j-1)\theta) \right)$$

where, the $T_{pavj}$ represents the average torque produced by the $j^{th}$ repeating unit. Before the magnet shifting, the partial average torque produced by each repeating unit is the same as each other, that is, $T_{pavj} = T_{pav}$.

Step 6.5, after the magnet shifting, the rotor is caused to be slightly asymmetrical. Therefore, the partial average torque of each repeating unit makes a tiny change that is far lower than value of torque ripple. The specific relationship is expressed as $$\begin{cases} T_{pavj} = T_{pav} + \Delta T_j \\ T_{prjn} = T_{pm} + \Delta T_{rj} \end{cases}$$

where $$\begin{cases} \Delta T = \frac{q}{2}\sum_{j=1}^{2}\Delta T_j + \frac{q}{2}\sum_{j=1}^{2}\sum_{n=1}^{\infty}\Delta T_{rj}\sin N_{ps}n(\alpha+(j-1)\theta) \\ T_r = \frac{q}{2}\sum_{j=1}^{2}\sum_{n=1}^{\infty}T_{pm}\sin N_{ps}n(\alpha+(j-1)\theta) \end{cases}$$

In the formula, $T_r$ is the main component of the torque ripple, which is recognized as the main study object. By using the trigonometric function formula, it is simplified as $$T_r = \frac{q}{2}\sum_{n=1}^{\infty}T_{pm}\frac{\sin N_{ps}n\theta}{\sin\frac{N_{ps}n\theta}{2}}\sin\left(N_{ps}n\left(\alpha+\frac{3}{2}\theta\right)\right)$$

Step 6.6, in order to reduce torque ripple, $T_r$ is supposed to be as small as possible and, in the extreme, to be zero. Then, the shifting angle is $$\theta_n = \frac{180°}{nN_{ps}} \text{ or } \theta_n = \frac{\pi}{nN_{ps}},$$

where $\theta_n$ represents the shifting angle that eliminates the $n^{th}$ main subharmonic of the torque ripple. When n=1, magnet shifting by $\theta_1$ degrees can eliminate the first main harmonic of the torque ripple. When n=2, magnet shifting by $\theta_2$ degrees can eliminate the second main harmonic of the torque ripple.

Further, in Step six, the first magnet shifting in Step six means that the selected basic repeating unit is alternately shifted by $\theta_1$ degrees.

Further, in Step seven, the second magnet shifting in Step seven means that the shifted basic repeating unit and the adjacent fixed basic repeating unit are chosen as one new repeating unit. For every pair of adjacent new repeating units, one new repeating unit is fixed, and the other new repeating unit is alternately shifted by $\theta_2$ degree. The second magnet shifting in Step seven is supposed to keep the same the shifting direction as the first magnet shifting in Step six.

The beneficial effect of the disclosure:

a) In the disclosure, the magnet shifting method not only reduces the torque ripple component caused by cogging torque, but also effectively reduces the torque ripple caused by permanent magnet torque or reluctance torque. Also, optimization of back-EMF and reduction of output torque ripple can significantly improve the stability of permanent magnet synchronous motors.

b) In the disclosure, the magnet shifting method comprehensively considers the minimum number of magnetic poles in each basic repeating unit that produces total torque ($N_0$) and the minimum number of magnetic poles in each basic repeating unit that produces partial torque ripple component ($N_{i0}$). Under the premise of reducing torque ripple significantly, the average output torque is maintained to be nearly the same as the original value.

c) In the disclosure, the magnet shifting method contains different choices of shifted repeating units. According to the main source of torque ripple, the shifted repeating unit can be reasonably chosen so that different kinds of motors can achieve similar and effective results.

d) In the disclosure, the magnet shifting method contains superposed effects from several magnets shifting. According to the requirements, the different subharmonics of torque ripple can be deeply weakened.

e) In the disclosure, the described magnet shifting method introduces less harmonic components of radial force density, which are inevitable. Compared with traditional magnet shifting methods, it can ease vibration and noise.

BRIEF DESCRIPTION OF THE DRAWINGS

The disclosure can be better understood by reading the following detailed description of non-restrictive illustrative embodiments while examining the appended drawings, wherein.

DETAILED DESCRIPTION

With reference to the appended drawings in the embodiment of the disclosure, the detailed embodiment of the disclosure is clearly and completely described in the following.

The following embodiments are for example only and not as a limitation to the disclosure.

Figure 2:
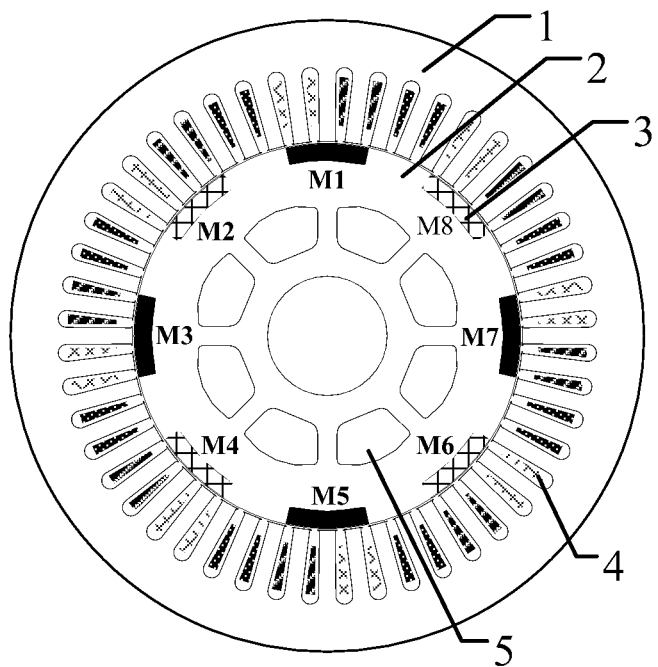
FIG. 2 schematically and partially illustrates structure cross-section of an inset-mounted permanent magnet synchronous motor (an original motor).

As shown in FIG. 2, an inset-mounted permanent magnet synchronous motor with three phases comprising an outer stator (1) and an inner rotor (2). The outer stator (1) includes forty-eight stator slots and embedded armature windings (4), and the inner rotor (2) includes a rotor core, eight magnetic poles (3) and six ventilation holes (5).

Figure 12:
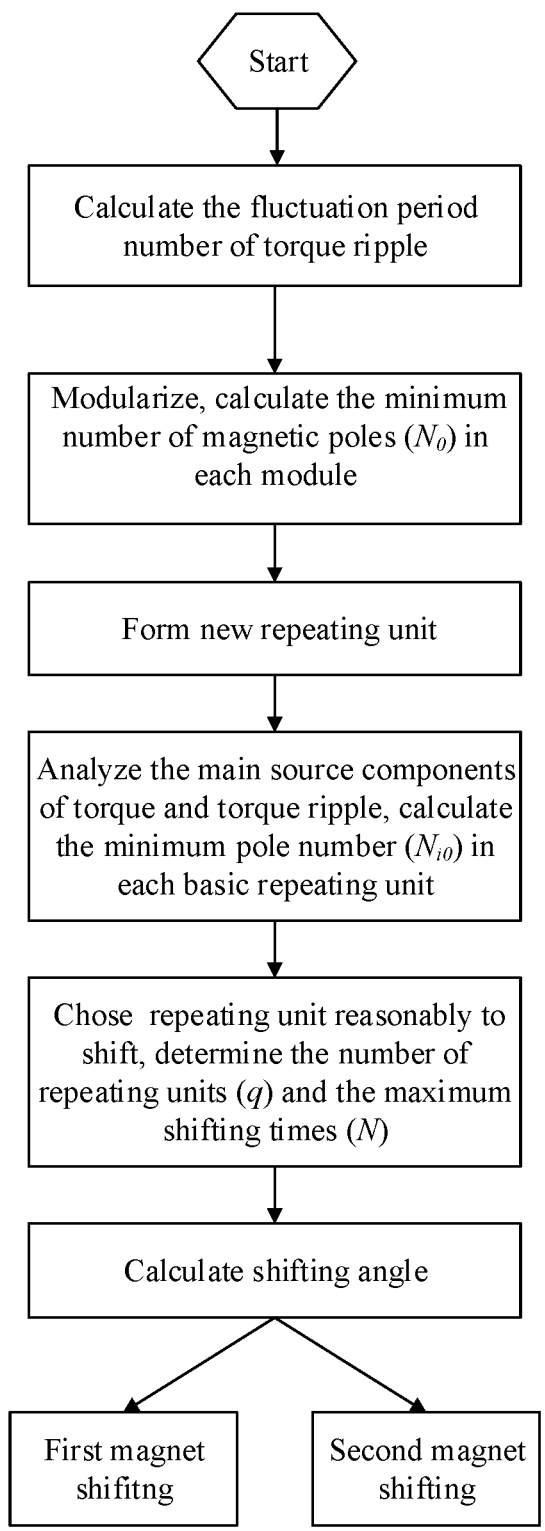
FIG. 12 shows a flow chart of magnet shifting as disclosed herein.

A three-phase inset-mounted permanent magnet synchronous motor is taken as an example, whose implementation steps are shown in FIG. 12.

1) Torque of target motor with different combination between poles and slots is analyzed. According to the relationship between the number of poles and slots, the fluctuation period number of torque ripple in one electric cycle is calculated to determine the general trend of its fluctuation. The fluctuation period number of torque ripple in one electric cycle is calculated by $$T_{ripple} = \frac{N_{ps}}{N_p}.$$

The calculating result is $$T_{ripple} = \frac{N_{ps}}{N_p} = \frac{48}{4} = 12,$$

where $N_s=48$, $N_p=4$; $N_{ps}=LCM(N_s, 2N_p)=LCM(48, 8)=48$. The target motor includes a surface mounted motor, a surface-inset motor and an interior embedded motor.

2) The rotor and magnets of the motor are modularized by calculating the minimum number of magnetic poles ($N_0$) in each module. Through modular analysis, the magnetic poles in each module can produce the same torque with consistency in waveform and phase. Then, each module containing the fewest magnetic poles is recognized as one basic repeating unit. The minimum number of magnetic poles ($N_0$) in each basic repeating unit is calculated by $$N_0 = \frac{N_{ps}}{N_s},$$

where $N_0$ is the minimum number of magnetic poles in each basic repeating unit, and $N_s$ is the slot number.

In the described step 2), the minimum number of magnetic poles in each basic repeating unit equals to one. That is $N_0=1$.

In the described step 2), the number of magnetic poles is eight ($2N_p=8$). According to the pole number of repeating units, the rotor of the target motor is modularized as eight basic partial modules. Each basic module is recognized as one basic repeating unit.

Figure 1:
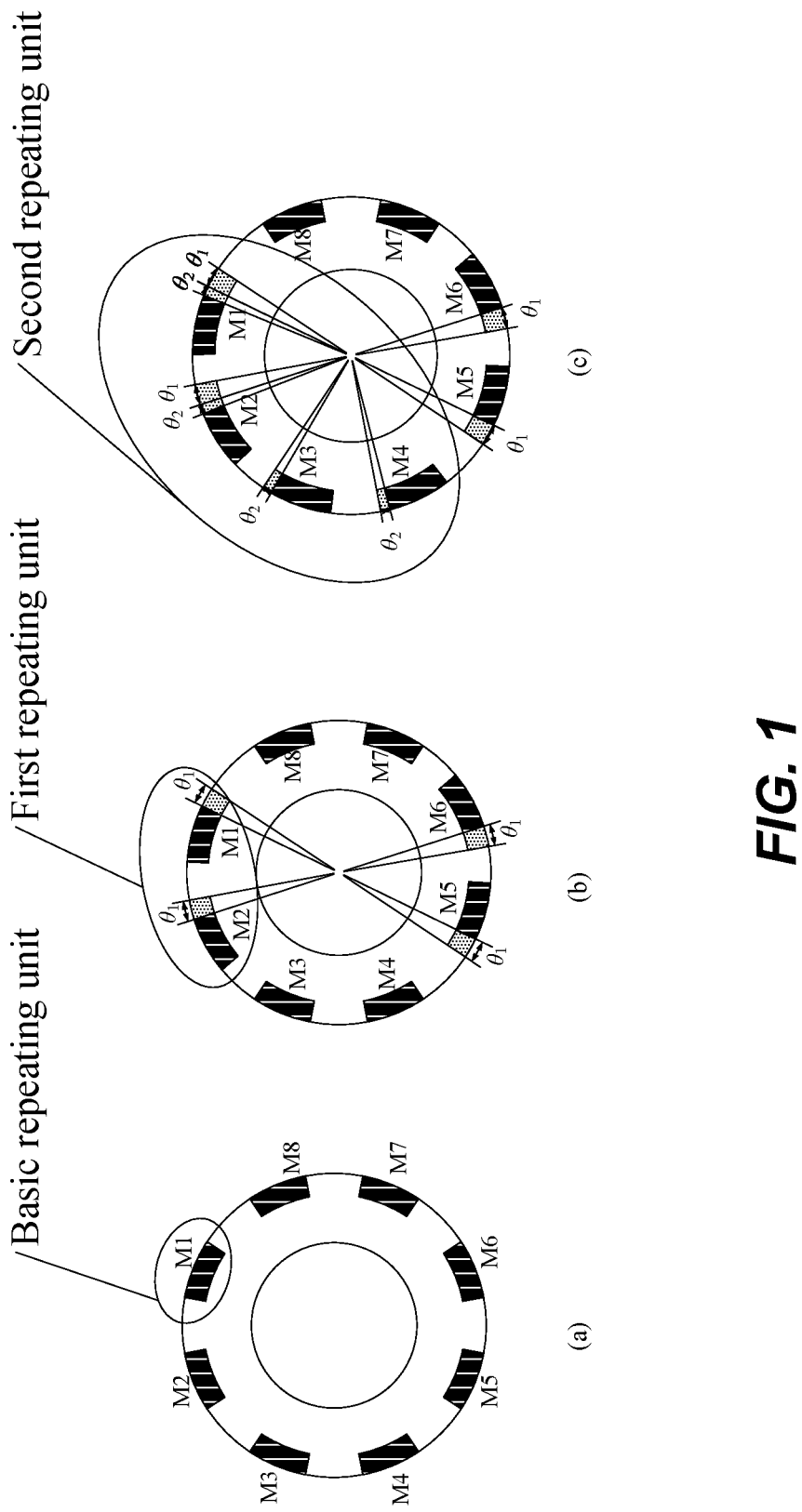
FIG. 1 schematically and partially illustrates, in perspective, magnet shifting ways and choices of a repeating unit according to an illustrative embodiment of the disclosure. Panel (a): Schematic diagram of the permanent magnet distribution of the original motor. Panel (b): Schematic diagram of the permanent magnet distribution of the first shifted motor. Panel (c): Schematic diagram of the permanent magnet distribution of the second shifted motor.

As shown in FIG. 1, Panel (a), a rotor of the original motor has eight magnetic poles. They are divided into eight groups (M1-M8), and each pole (Mi) is recognized as one basic repeating unit.

3) Two or more of basic repeating units can be merged to form some new repeating units, all of which can also produce the same torques with consistency in waveform and phase. A different number of new repeating units can be combined to generate different magnet shifting ways.

In the described step 3), the "new repeating unit" consists of k basic repeating units, and the pole number of a "new repeating unit" is $kN_0$ (k=1, 2, 4). Three different repeating units are available for selection in all.

4) The main source of torque and torque ripple are analyzed, and their generation is modularized and analyzed. The basic repeating unit to produce the main source of torque and torque ripple is determined, and the minimum pole number ($N_{i0}$) in each basic repeating unit is calculated.

Table I gives the torque performances of the original motor. It can be seen that the total torque ripple is 35.9%. The percentage of cogging torque is only 1.3% while the peak-to-peak value of reluctance torque is high, approximately 52.5 Nm, which accounts for 22% of total average torque. In addition, the peak-to-peak value of permanent magnet torque accounts for 12% of total average torque. Therefore, the reluctance torque ripple and the permanent magnet torque ripple are the main source of total torque ripple.

In the described step 4), the minimum pole number in each basic repeating unit that produces the same reluctance torque is calculated and equals to one, and that of permanent magnet torque equals to two. That is $N_{20}=1$, $N_{30}=2$.

TABLE I

| Torque Performances of the target motor | |
|---|---|
| Parameter | Value |
| Average output torque (Nm) | 244 |
| Peak-to-peak value of cogging torque (Nm) | 1.7 |
| Peak-to-peak value of reluctance torque (Nm) | 52.5 |
| Torque ripple (%) | 35.9 |
| Cogging torque ripple ratio (%) | 1.3 |
| Reluctance torque ripple ratio (%) | 22 |
| Permanent magnet torque ripple ratio (%) | 12 |

5) Considering the $N_0$ and $N_{i0}$ comprehensively, shifting repeating unit is chosen reasonably. According to the number of poles in the selected repeating unit (b), the number of repeating units (q) and the maximum shifting times (N) are determined respectively. When the number of poles (b) in the selected repeating unit, the number of repeating units (q) and the maximum shifting times (N) in Step five are determined, the total torque can be composed of partial torque produced by each repeating unit. That is $$T = \sum_{i=1}^{q} T_i,$$

where $T_i$ is torque produced by the $i^{th}$ repeating unit. Here, the number of poles (b) in the selected repeating unit, the number of repeating units (q) and the maximum shifting times (N) are respectively determined by 1) $\begin{cases} b = kN_0 \\ b_{max} \leq N_p \end{cases},$ k belongs to integer.

2) $q = \frac{2N_p}{b}.$ 3) $N = \log_2\left(\frac{2N_p}{b}\right),$

N belongs to integer.

In the described step 2), $N_0=1$.

In the described step 4), $N_{20}=1$, $N_{30}=2$.

Considering the $N_0$, $N_{20}$ and $N_{30}$ comprehensively, two basic repeating units are chosen as first repeating unit to comprehensively consider crossing effect between reluctance torque and permanent magnet torque. That is b=2.

On this basis, the number of repeating unit equals to four and the maximum shifting times equals to two. That is q=4, N=2.

As shown in FIG. 1, Panel (b), one pair of magnetic poles (two basic repeating units) is chosen as first repeating unit and they are (M1, M2), (M3, M4), (M5, M6), and (M7, M8), respectively. All of these are chosen to eliminate the first main harmonic of torque ripple.

In order to weaken the first main harmonic of torque ripple, the accurate angle ($\theta_1$) of magnet shifting for the first time is calculated, and the selected first repeating unit is shifted anti-clockwise by $\theta_1$ degrees for the first time. The shifting angles are calculated by Step 6.1, the torque expression of the motor can be expressed as the sum of the average torque and torque ripple, which is as follows:

$$\begin{cases} T = T_{all\_av} + T_{all\_rip} \\ T_{all\_rip} = \sum_{n=1}^{\infty} T_m \sin N_{ps} n\alpha = q \sum_{n=1}^{\infty} T_{pm} \sin N_{ps} n\alpha \end{cases}$$

where the $T_{all\_av}$ represents the average torque and the $T_{all\_rip}$ represents the torque ripple. According to the periodicity of torque ripple, it can be expressed as the form of the Fourier series.

Step 6.2, the torque T of the motor can be expressed as the sum of the partial torque component $T_i$ produced by the $i^{th}$ repeating unit. And the partial torque component $T_i$ can also be expressed as the sum of the corresponding partial average value component and the corresponding partial torque ripple. When one repeating unit is shifted by $\theta$ degrees, the corresponding partial torque ripple produced by the shifted repeating unit changes only in phase. That is $$T_{rip}' = \sum_{n=1}^{\infty} T_{pm} \sin N_{ps} n(\alpha + \theta)$$

Step 6.3, the total torque ripple is superposed by the torque ripple produced by shifted repeating units and that of fixed repeated units:

$$T_{all\_rip} = \frac{q}{2} \sum_{j=1}^{2} \sum_{n=1}^{\infty} T_{pm} \sin N_{ps} n(\alpha + (j-1)\theta)$$

Step 6.4, based on these, the output torque can be further expressed as $$T = \frac{q}{2} \sum_{j=1}^{2} \left( T_{pavj} + \sum_{n=1}^{\infty} T_{prjn} \sin N_{ps} n(\alpha + (j-1)\theta) \right)$$

where, the $T_{pavj}$ represents the average torque produced by the $j^{th}$ repeating unit. Before the magnet shifting, the partial average torque produced by each repeating unit is the same as each other, that is, $T_{pavj}=T_{pav}$.

Step 6.5, after the magnet shifting, the rotor is caused to be slightly asymmetrical. Therefore, the partial average torque of each repeating unit makes a tiny change that is far lower than value of torque ripple. The specific relationship is expressed as $$\begin{cases} T_{pavj} = T_{pav} + \Delta T_j \\ T_{prjn} = T_{pm} + \Delta T_{rj} \end{cases}$$

where $$\begin{cases} \Delta T = \frac{q}{2} \sum_{j=1}^{2} \Delta T_j + \frac{q}{2} \sum_{j=1}^{2} \sum_{n=1}^{\infty} \Delta T_{rj} \sin N_{ps} n(\alpha + (j-1)\theta) \\ T_r = \frac{q}{2} \sum_{j=1}^{2} \sum_{n=1}^{\infty} T_{pm} \sin N_{ps} n(\alpha + (j-1)\theta) \end{cases}$$

In the formula, $T_r$ is the main component of the torque ripple, which is recognized as the main study object. By using the trigonometric function formula, it is simplified as $$T_r = \frac{q}{2} \sum_{n=1}^{\infty} T_{pm} \frac{\sin N_{ps} n\theta}{\sin \frac{N_{ps} n\theta}{2}} \sin\left(N_{ps} n\left(\alpha + \frac{3}{2}\theta\right)\right).$$

Step 6.6, in order to reduce torque ripple, $T_r$ is supposed to be as small as possible and, in the extreme, to be zero. Then, the shifting angle is $$\theta_n = \frac{180°}{n N_{ps}} \text{ or } \theta_n = \frac{\pi}{n N_{ps}},$$

where $\theta_n$ represents the shifting angle that eliminates the $n^{th}$ main subharmonic of the torque ripple. When n=1, magnet shifting by $\theta_1$ degrees can eliminate the first main harmonic of the torque ripple. When n=2, magnet shifting by $\theta_2$ degrees can eliminate the second main harmonic of the torque ripple.

Here, the accurate angle of magnet shifting for the first time ($\theta_1$) is calculated and equals to 3.75 degrees. That is $\theta_1=180°/48=3.75°$. As shown in FIG. 1, Panel (b), for every pair of adjacent repeating units, one repeating unit ((M1, M2) or (M5, M6)) is alternately shifted by $\theta_1$ degree, and the other repeating unit ((M3, M4) or (M7, M8)) is fixed.

6) In order to weaken the second main harmonic of torque ripple, the accurate angle ($\theta_2$) of magnet shifting for the second time is calculated. Based on the first magnet shifting, the shifted basic repeating unit and the adjacent fixed basic repeating unit are chosen as one new repeating unit. The new repeating units are reconsidered and then alternately shifted by $\theta_2$ degrees. The new repeating unit is named "second repeating unit."

In the described step 7), the accurate angle of magnet shifting for the second time ($\theta_2$) is calculated and equals to 1.875 degrees. That is $\theta_2=180°/2\times48=1.875°$.

As shown in FIG. 1, Panel (c), based on the first magnet shifting, the shifted basic repeating unit (M1, M2) and the adjacent fixed basic repeating unit (M3, M4) are chosen as one new repeating unit. That is (M1, M2, M3, M4), named "second repeating unit." Similarly, the other second repeating unit is (M5, M6, M7, M8). For every pair of adjacent new repeating units, one new repeating unit (M5, M6, M7, M8) is fixed, and the other new repeating unit (M1, M2, M3, M4) is shifted by $\theta_2$ degree and named the "second magnet shifting." The second magnet shifting in Step seven is supposed to keep the same shifting direction as the first magnet shifting in Step six.

Table II lists the angles of magnets shifting for reducing first main and second main harmonics.

TABLE II

Shifting Angle of Every Repeating Unit

| Repeating Unit | Shifting Angle of Reduction $n^{th}$ Main Harmonics (deg.) | |
|---|---|---|
| | 1st | 2nd |
| (M1, M2) | $\theta_1$ (3.75) | $\theta_1$ (3.75) + $\theta_2$ (1.875) |
| (M3, M4) | 0 | $\theta_2$ (1.875) |
| (M5, M6) | $\theta_1$ (3.75) | $\theta_1$ (3.75) |
| (M7, M8) | 0 | 0 |

FIG. 2 illustrates the cross-sectional structure of an inset-mounted permanent magnet synchronous motor (the original motor). Based on the original motor, magnetic poles are shifted to obtain one embodiment of the motor disclosed herein. Comparing the torque performance between the original and the embodiments of the motors disclosed herein, the beneficial effect of the disclosure can be clearly shown.

Figure 3:
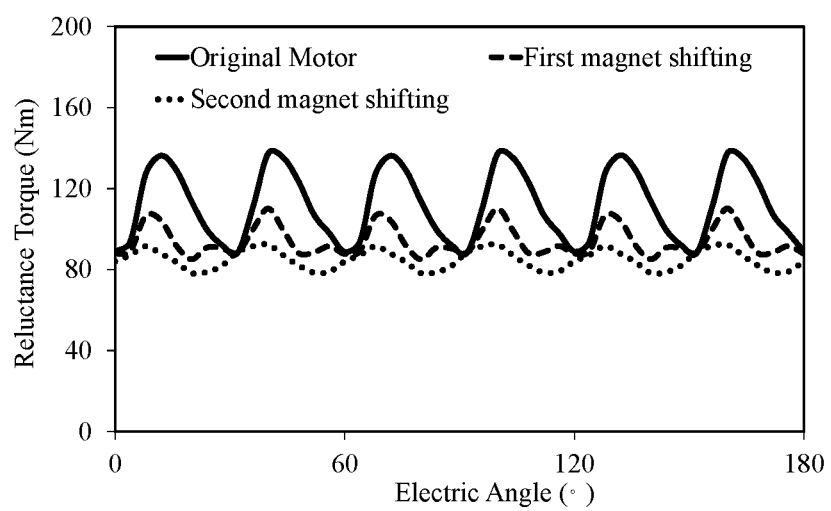
FIG. 3 shows a comparison diagram of reluctance torques between the original motor and the modified motor with magnet shifting of one embodiment of the motor disclosed herein.
Figure 4:
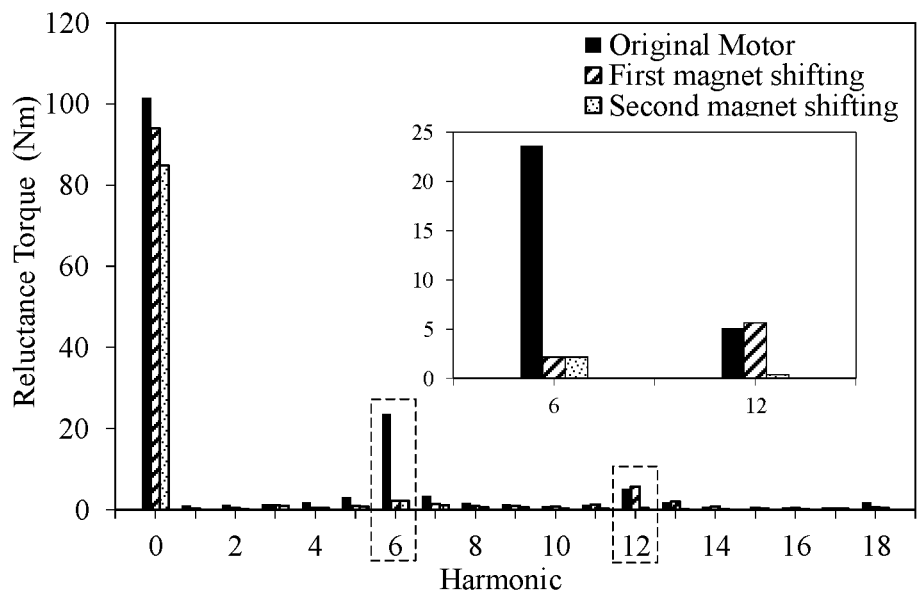
FIG. 4 shows harmonic analysis of reluctance torques between the original motor and one embodiment of the motor disclosed herein.

FIG. 3 and FIG. 4 show comparison diagrams and their harmonic analysis of reluctance torques (main source of torque ripple) between the original motor and the modified motor with magnet shifting (one embodiment of the motor disclosed herein). It can be seen from FIG. 3 that the peak-to-peak value of reluctance torque has been greatly reduced from 52.5 Nm to 25.2 Nm after the first magnet shifting. Moreover, the peak-to-peak value of reluctance torque has been further reduced to 14.2 Nm after the second magnet shifting. At the same time, it can be seen from the FIG. 4 that the first main harmonic ($6^{th}$ harmonic) and the second main harmonic ($12^{th}$ harmonic) are successively eliminated.

Figure 5:
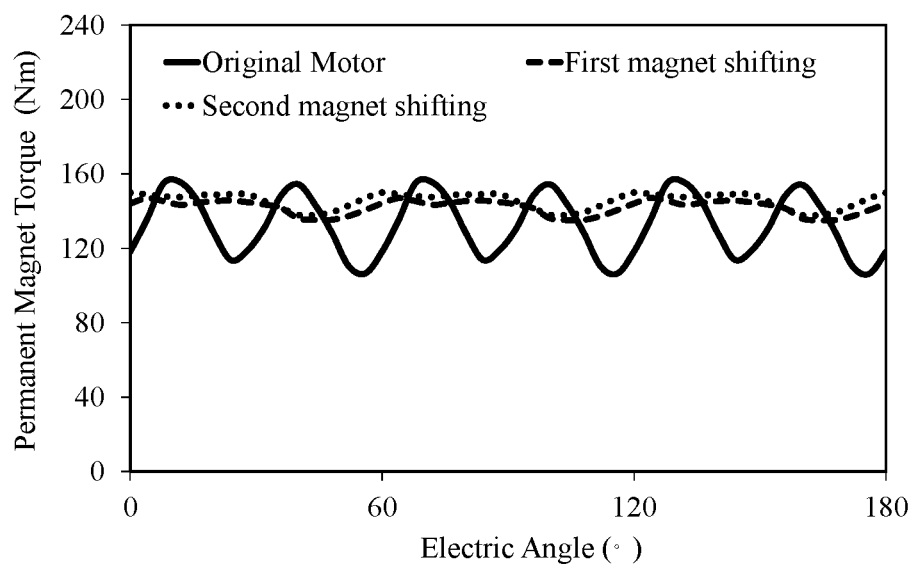
FIG. 5 shows a comparison diagram of permanent magnet torques between the original motor and one embodiment of the motor disclosed herein.
Figure 6:
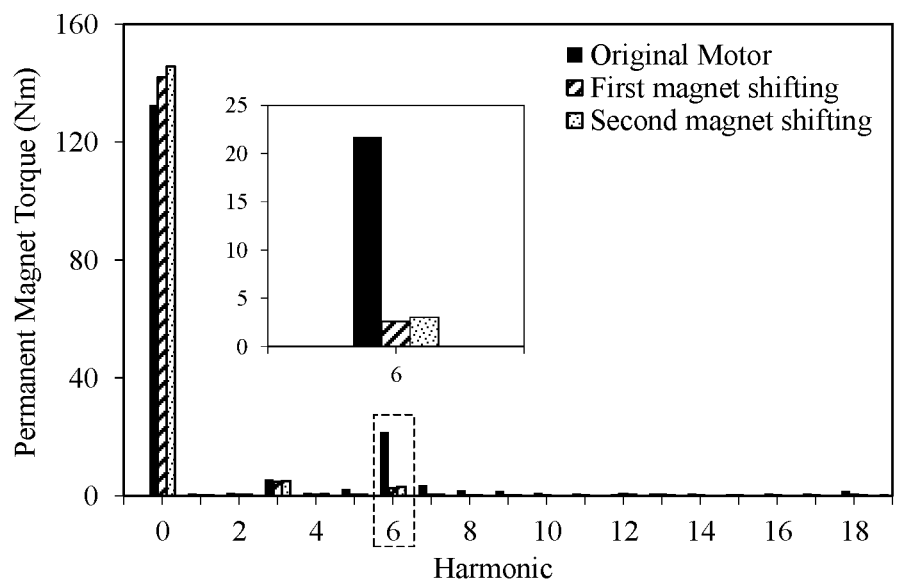
FIG. 6 shows harmonic analysis of permanent magnet torques between the original motor and one embodiment of the motor disclosed herein.

FIG. 5 and FIG. 6 show comparison diagrams and their harmonic analysis of permanent magnet torques (the other main source of torque ripple) between the original motor and one embodiment of the motor disclosed herein. It can be seen from FIG. 5 that the peak-to-peak value of permanent magnet torque has been greatly reduced from 49.1 Nm to 11.9 Nm after magnet shifting twice. At the same time, it can be seen from the FIG. 6 that the first main harmonic ($6^{th}$ harmonic) is eliminated.

Figure 7:
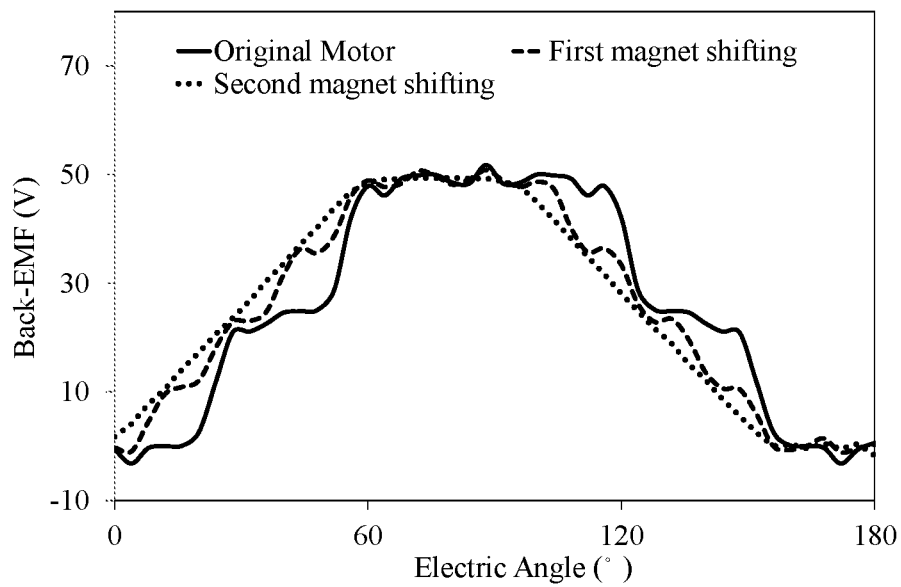
FIG. 7 shows a comparison diagram of back-EMFs between the original motor and one embodiment of the motor disclosed herein.
Figure 8:
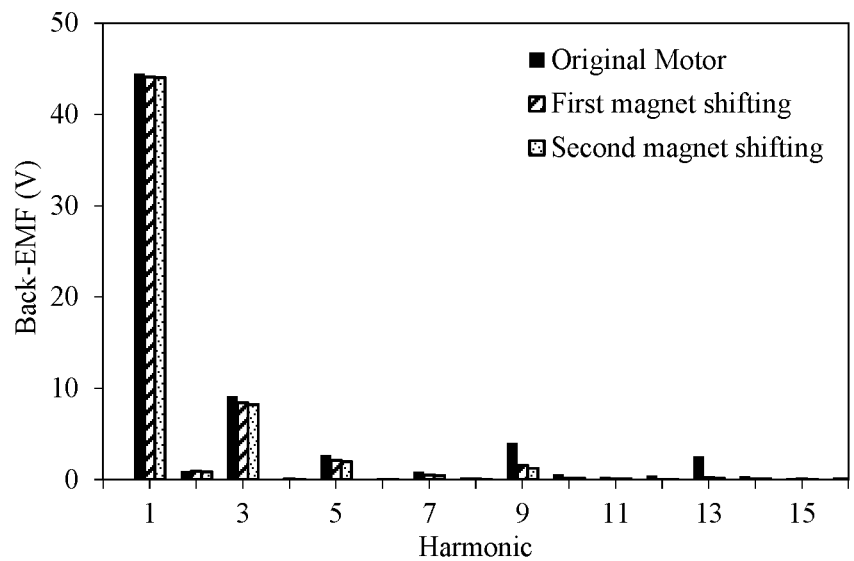
FIG. 8 shows harmonic analysis of back-EMFs between the original motor and one embodiment of the motor disclosed herein.

FIG. 7 and FIG. 8 show comparison diagrams and their harmonic analysis of back electromotive force (EMF) between the original motor and one embodiment of the motor disclosed herein. It can be seen from FIG. 7 that the sinusoidal characteristic of the back-EMF has been greatly improved, compared with the original motor. In addition, it can be seen from FIG. 8 that not only some harmonics are greatly eliminated, but the amplitude of fundamental back-EMF is almost constant with that of the original motor. That is, the torque ripple can be greatly reduced while the torque density can be nearly maintained.

Figure 9:
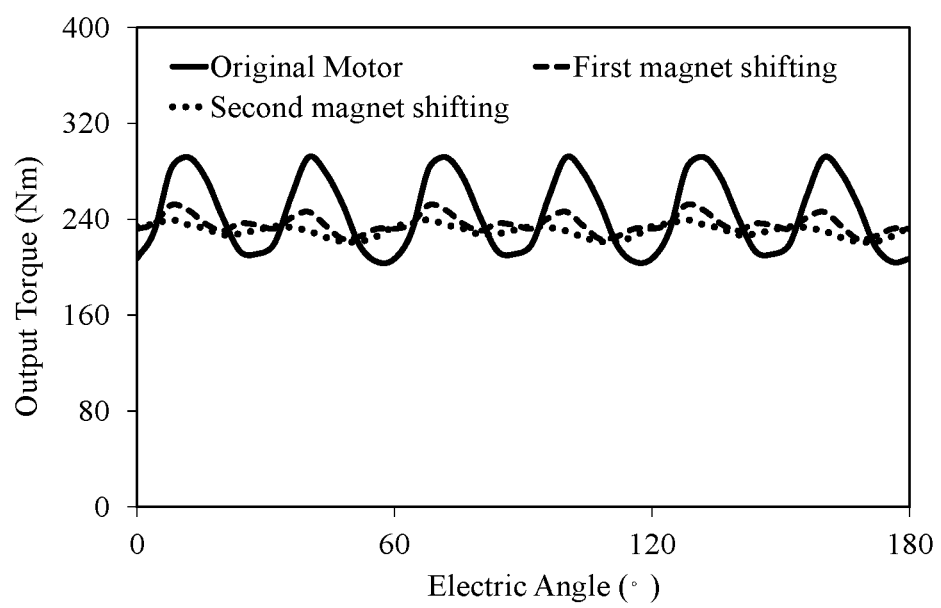
FIG. 9 shows a comparison diagram of output torques between the original motor and one embodiment of the motor disclosed herein.
Figure 10:
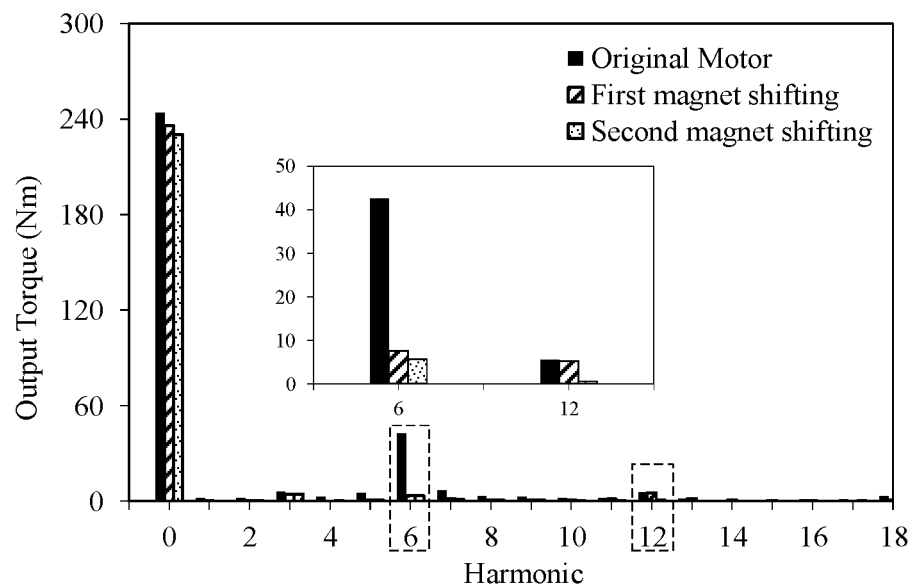
FIG. 10 shows harmonic analysis of output torques between the original motor and one embodiment of the motor disclosed herein.

FIG. 9 and FIG. 10 show comparison diagrams and their harmonic analysis of output torques between the original motor and one embodiment of the motor disclosed herein. It can be seen that the torque performance has been effectively improved. After the first magnet shifting, torque ripple is greatly reduced from 35.9% to 12.7%. After the second magnet shifting, torque ripple is reduced further to 7.9%. Also, it can be seen from FIG. 10 that the first main harmonic ($6^{th}$ harmonic) and the second main harmonic ($12^{th}$ harmonic) are successively eliminated.

Figure 11:
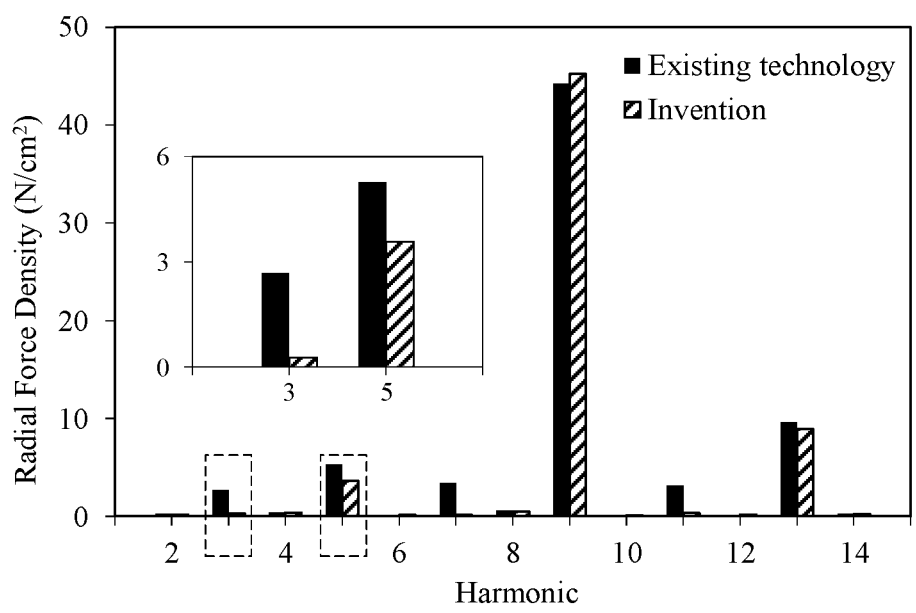
FIG. 11 shows harmonic analysis of radial force densities between the existing technology and this disclosure.

FIG. 11 shows harmonic analysis of radial force densities between the existing magnet shifting technology and the disclosure. It can be seen from FIG. 11 that the lowest order harmonic of radial force density in the disclosure is the fifth order harmonic while that of the existing magnet shifting technology are the third order harmonic. The former is higher than the latter. Moreover, harmonic amplitude of the disclosure is lower than that of the existing magnet shifting technology, and the contained harmonic content in the disclosure is less than that of the existing magnet shifting technology. This means, magnets shifting in the disclosure may cause relatively less vibration and acoustic noise.

In summary, the application discloses a method named "Magnet Shifting" to reduce torque ripple of permanent magnet synchronous motors. Reasonable repeating unit is chosen to shift, so as to reduce the main source of torque ripple, optimize the back-EMF, and maintain torque density. It is involved in the way of reasonably choosing the repeating unit of magnetic pole, the shifting ways and the shifting angle calculation of the first and second magnet shifting, which are carried on the repeating unit of magnetic poles individually or repeatedly to improve the performance of the motor. It also can quickly calculate the shifting angle of the magnetic pole by reasonably choosing the repeating unit. Magnet shifting can effectively enhance the sinusoidal degree of back electrodynamic force (back-EMF) waveform, where the repeating units can offset the torque ripple between the maximum and the minimum value to reduce the different torque harmonics. Also, the output torque can be maintained nearly to the original value while less vibration noise of the motor is inevitably introduced.

While the method herein described, and the forms of apparatus for carrying this method into effect, constitute preferred embodiments of this disclosure, it is to be understood that the invention is not limited to this precise method and forms of apparatus, and that changes may be made in either without departing form the scope of the invention, which is defined in the appended claims.

What is claimed is:

1. A method of reducing torque ripple of a permanent magnet synchronous motor, the method comprising:
   Step one: analyzing torque of a target motor with different combinations between poles and slots, wherein according to relationship between pole number and slot number, a fluctuation period number of torque ripple in one electric cycle is calculated to determine a general trend of its fluctuation;
   Step two: calculating a minimum number of magnetic poles ($N_0$) in each module to modularize rotor and magnets of the motor, wherein through modular analysis, the magnetic poles in each module produce the same torque with consistency in waveform and phase, then each module containing fewest magnetic poles is recognized as one basic repeating unit;
   Step three: merging two or more basic repeating units to form a new repeating unit, which can also produce same torque with consistency in waveform and phase, wherein a different number of new repeating units has an effect on magnet shifting;

Step four: analyzing and modularizing main source of torque and torque ripple so as to determine the basic repeating unit to produce main source of torque and torque ripple, and to calculate a minimum pole number ($N_{i0}$) in each basic repeating unit;

Step five: choosing a reasonable repeating unit to shift by considering $N_0$ and $N_{i0}$ comprehensively, according to number of poles (b) in the selected repeating unit, and respectively determining number of repeating units (q) and maximum shifting times (N);

Step six: calculating accurate angle ($\theta_1$) of magnet shifting a first time in order to weaken a first main harmonic of torque ripple, and shifting the selected repeating unit counterclockwise by $\theta_1$ degrees, wherein the selected repeating unit is the first repeating unit, and the first application is the first magnet shifting;

Step seven: calculating accurate angle ($\theta_2$) of magnet shifting for a second time in order to weaken the second main harmonic of torque ripple, based upon the first magnet shifting, new repeating unit is reconsidered, formed, and then shifted by $\theta_2$ degrees, wherein the new repeating unit is the second repeating unit, and the second application is the second magnet shifting; and Step eight: calculating accurate angle ($\theta_n$) of magnet shifting for $n^{th}$ time to weaken $n^{th}$ order main harmonic of torque ripple on basis of $(n-1)^{th}$ magnet shifting, new repeating unit is reconsidered for $n^{th}$ time and then shifted by $\theta_n$ degrees, the newest repeating unit is the $n^{th}$ repeating unit.

2. The method according to claim 1, wherein the fluctuation period number of torque ripple in one electric cycle in Step one is calculated by $$T_{ripple} = \frac{N_{ps}}{N_p},$$

wherein $T_{ripple}$ is the fluctuation period number of torque ripple in one electric cycle, $N_s$ is the slot number, $N_p$ is pole-pair number, and $N_{ps}$ is least common multiple of slot number ($N_a$) and pole number ($2N_p$), $N_{ps}$=LCM ($N_s$, $2N_p$).

3. The method according to claim 1, wherein the basic repeating unit in Step two is a group of poles that produces torques with consistency in waveforms and phases.

4. The method according to claim 1, wherein the minimum number of magnetic poles in each basic repeating unit in Step two is calculated by $$N_0 = \frac{N_{ps}}{N_s},$$

where $N_0$ is minimum number of magnetic poles in each basic repeating unit, and $N_s$ is slot number.

5. The method according to claim 1, wherein the new repeating unit in Step three is combined with k basic repeating units, then the number of magnetic poles in one new repeating unit is $kN_0$.

6. The method according to claim 1, wherein the main source of torque ripple in Step four influences cogging torque, reluctance torque and permanent magnet torque, and wherein corresponding minimum numbers of magnetic poles ($N_0$) in each basic repeating unit are $N_{10}$, $N_{20}$, $N_{30}$, respectively.

7. The method according to claim 1, wherein, in Step five, the number of poles (b) in the selected repeating unit, the number of repeating units (q) and the maximum shifting times (N) are respectively determined by 1) $\begin{cases} b = kN_0 \\ b_{max} \leq N_p \end{cases}$, k belongs to integer;

2) $q = \frac{2N_p}{b}$;  3) $N = \log_2\left(\frac{2N_p}{b}\right)$,

N belongs to integer;

when the number of poles (b) in the selected repeating unit, the number of repeating units (q) and the maximum shifting times (N) in Step five are determined, the total torque is composed of partial torque produced by each repeating unit, i.e., $$T = \sum_{i=1}^{q} T_i,$$

where $T_i$ is torque produced by the $i^{th}$ repeating unit.

8. The method according to claim 1, in Step six, wherein the accurate angle ($\theta_n$) of magnet shifting for the $n^{th}$ time are calculated by Step 6.1, expressing torque expression of the motor as sum of average torque and torque ripple, as follows:

$$\begin{cases} T = T_{all\_av} + T_{all\_rip} \\ T_{all\_rip} = \sum_{n=1}^{\infty} T_{rn}\sin N_{ps}n\alpha = q\sum_{n=1}^{\infty} T_{pm}\sin N_{ps}n\alpha \end{cases}$$

wherein $T_{all\_av}$ represents average torque and $T_{all\_rip}$ represents torque ripple, according to periodicity of torque ripple expressed as a form of the Fourier series;

Step 6.2, torque T of the motor is sum of partial torque component $T_i$ produced by $i^{th}$ repeating unit, and partial torque component $T_i$ is sum of corresponding partial average value component and corresponding partial torque ripple, and when one repeating unit is shifted by $\theta$ degrees, the corresponding partial torque ripple produced by the shifted repeating unit changes only in phase, as follows:

$$T'_{rip} = \sum_{n=1}^{\infty} T_{pm}\sin N_{ps}n(\alpha + \theta);$$

Step 6.3, the total torque ripple is superposed by the torque ripple produced by shifted repeating units and that of fixed repeated units:

$$T_{all\_rip} = \frac{q}{2}\sum_{j=1}^{2}\sum_{n=1}^{\infty} T_{prjn}\sin N_{ps}n(\alpha + (j-1)\theta);$$

Step 6.4, based on these, the output torque is expressed as $$T = \frac{q}{2}\sum_{j=1}^{2}\left(T_{pavj} + \sum_{n=1}^{\infty}T_{prjn}\sin N_{ps}n(\alpha+(j-1)\theta)\right)$$

where, $T_{pavj}$ represents the average torque produced by $j^{th}$ repeating unit before the magnet shifting, the partial average torque produced by each repeating unit is the same as each other, i.e., $T_{pavj}=T_{pav}$;

Step 6.5, after the magnet shifting, the rotor is caused to be slightly asymmetrical, therefore, the partial average torque of each repeating unit makes a change far lower than value of torque ripple, the specific relationship being expressed as $$\begin{cases} T_{pavj} = T_{pav} + \Delta T_j \\ T_{prjn} = T_{pm} + \Delta T_{rj} \end{cases}$$

where $$\begin{cases} \Delta T = \frac{q}{2}\sum_{j=1}^{2}\Delta T_j + \frac{q}{2}\sum_{j=1}^{2}\sum_{n=1}^{\infty}\Delta T_{rj}\sin N_{ps}n(\alpha+(j-1)\theta) \\ T_r = \frac{q}{2}\sum_{j=1}^{2}\sum_{n=1}^{\infty}T_{pm}\sin N_{ps}n(\alpha+(j-1)\theta) \end{cases}$$

$T_r$ is the main component of the torque ripple, which is recognized as the main study object by using the trigonometric function formula simplified as $$T_r = \frac{q}{2}\sum_{n=1}^{\infty}T_{prn}\frac{\sin N_{ps}n\theta}{\sin\frac{N_{ps}n\theta}{2}}\sin\left(N_{ps}n\left(\alpha+\frac{3}{2}\theta\right)\right);$$

Step 6.6, in order to reduce torque ripple, $T_r$ is minimized, then, the shifting angle is $$\theta_n = \frac{180°}{nN_{ps}} \text{ or } \theta_n = \frac{\pi}{nN_{ps}},$$

where $\theta_n$ represents the shifting angle that eliminates the $n^{th}$ main subharmonic of the torque ripple, when n=1, magnet shifting by $\theta_1$ degrees reduces the first main harmonic of the torque ripple, and when n=2, magnet shifting by $\theta_2$ degrees reduces the second main harmonic of the torque ripple.

9. The method according to claim 1, wherein the first magnet shifting in Step six has the selected basic repeating unit is alternately shifted by $\theta_1$ degrees.

10. The method according to claim 1, wherein the second magnet shifting in Step seven has the shifted basic repeating unit and the adjacent fixed basic repeating unit chosen as one new repeating unit, wherein for every pair of adjacent new repeating units, one new repeating unit is fixed, and the other new repeating unit is alternately shifted by $\theta_2$ degrees, and wherein the second magnet shifting in Step seven keeps the same the shifting direction as the first magnet shifting in Step six.

11. A method of reducing torque ripple in a permanent magnet synchronous motor, the method comprising:

Step (a): analyzing torque of a target motor with different combinations between poles and slots, wherein according to relationship between pole number and slot number, a fluctuation period number of torque ripple in one electric cycle is calculated to determine a general trend of its fluctuation;

Step (b): calculating a minimum number of magnetic poles ($N_0$) in each module to modularize rotor and magnets of the motor, wherein through modular analysis, the magnetic poles in each module produce the same torque with consistency in waveform and phase, then, each module containing fewest magnetic poles is recognized as one basic repeating unit;

Step (c): merging at least two basic repeating units to form a new repeating unit, which can also produce same torque with consistency in waveform and phase, wherein a different number of new repeating units has an effect on magnet shifting;

Step (d): analyzing and modularizing main source of torque and torque ripple so as to determine the basic repeating unit to produce main source of torque and torque ripple, and to calculate a minimum pole number ($N_{i0}$) in each basic repeating unit;

Step (e): choosing a reasonable repeating unit to shift by considering $N_0$ and $N_{i0}$ comprehensively, according to number of poles (b) in the selected repeating unit, respectively determining number of repeating units (q) and maximum shifting times (N);

Step (f): calculating accurate angle ($\theta_1$) of magnet shifting a first time in order to weaken a first main harmonic of torque ripple, and shifting the selected repeating unit counterclockwise by $\theta_1$ degrees, wherein the selected repeating unit is the first repeating unit, and the first application is the first magnet shifting;

Step (g): calculating accurate angle ($\theta_2$) of magnet shifting for a second time in order to weaken the second main harmonic of torque ripple, based upon the first magnet shifting, new repeating unit is reconsidered, formed, and then shifted by $\theta_2$ degrees, wherein the new repeating unit is the second repeating unit, and the second application is the second magnet shifting; and Step (h): calculating accurate angle ($\theta_n$) of magnet shifting for $n^{th}$ time to weaken $n^{th}$ order main harmonic of torque ripple on basis of $(n-1)^{th}$ magnet shifting, new repeating unit is reconsidered for $n^{th}$ time and then shifted by $\theta_n$ degrees, the newest repeating unit is the $n^{th}$ repeating unit.

12. The method according to claim 11, wherein the fluctuation period number of torque ripple in one electric cycle in Step (a) is calculated by $$T_{ripple} = \frac{N_{ps}}{N_p},$$

wherein $T_{ripple}$ is the fluctuation period number of torque ripple in one electric cycle, $N_s$ is slot number, $N_p$ is pole-pair number, and $N_{ps}$ is least common multiple of slot number ($N_s$) and pole number ($2N_p$), $N_{ps}$=LCM ($N_s, 2N_p$).

13. The method according to claim 11, wherein the basic repeating unit in Step (b) is a group of poles that produces torques with consistency in waveforms and phases.

14. The method according to claim 11, wherein the minimum number of magnetic poles in each basic repeating unit in Step (b) is calculated by $$N_0 = \frac{N_{ps}}{N_s},$$

wherein $N_0$ is minimum number of magnetic poles in each basic repeating unit, and $N_s$ is slot number.

15. The method according to claim 11, wherein when the new repeating unit in Step (c) is combined with k basic repeating units, then the number of magnetic poles in one new repeating unit is $kN_0$.

16. The method according to claim 11, wherein the main source of torque ripple in Step (d) influences cogging torque, reluctance torque, and permanent magnet torque, and wherein corresponding minimum numbers of magnetic poles ($N_0$) in each basic repeating unit are $N_{10}$, $N_{20}$, $N_{30}$, respectively.

17. The method according to claim 11, wherein, in Step (e), the number of poles (b) in the selected repeating unit, the number of repeating units (q) and the maximum shifting times (N) are respectively determined by $$\begin{cases} b = kN_0 \\ b_{\max} \leq N_p \end{cases}, \quad 1)$$

k belongs to integer;

$$2)\ q = \frac{2N_p}{b}; \quad 3)\ N = \log_2\left(\frac{2N_p}{b}\right),$$

N belongs to integer;

when the number of poles (b) in the selected repeating unit, the number of repeating units (q) and the maximum shifting times (N) in Step (e) are determined, the total torque is composed of partial torque produced by each repeating unit, i.e., $$T = \sum_{i=1}^{q} T_i,$$

where T is torque produced by the $i^{th}$ repeating unit.

18. The method according to claim 11, in Step (f), wherein the accurate angle ($\theta_n$) of magnet shifting for the $n^{th}$ time are calculated by:

Step (f)-1, expressing torque expression of the motor as sum of average torque and torque ripple, as follows:

$$\begin{cases} T = T_{all\_av} + T_{all\_rip} \\ T_{all\_rip} = \sum_{n=1}^{\infty} T_m \sin N_{ps} n\alpha = q \sum_{n=1}^{\infty} T_{pm} \sin N_{ps} n\alpha \end{cases}$$

wherein $T_{all\_av}$ represents average torque and $T_{all\_rip}$ represents torque ripple, according to periodicity of torque ripple expressed as a form of the Fourier series;

Step (f)-2, torque T of the motor is sum of partial torque component $T_i$ produced by $i^{th}$ repeating unit, and partial torque component $T_i$ is sum of corresponding partial average value component and corresponding partial torque ripple, and when one repeating unit is shifted by θ degrees, the corresponding partial torque ripple produced by the shifted repeating unit changes only in phase, as follows:

$$T'_{rip} = \sum_{n=1}^{\infty} T_{pm} \sin N_{ps} n(\alpha + \theta);$$

Step (f)-3, the total torque ripple is superposed by the torque ripple produced by shifted repeating units and that of fixed repeated units:

$$T_{all\_rip} = \frac{q}{2} \sum_{j=1}^{2} \sum_{n=1}^{\infty} T_{prjn} \sin N_{ps} n(\alpha + (j-1)\theta);$$

Step (f)-4, based on these, the output torque is expressed as $$T = \frac{q}{2} \sum_{j=1}^{2} \left( T_{pavj} + \sum_{n=1}^{\infty} T_{prjn} \sin N_{ps} n(\alpha + (j-1)\theta) \right)$$

where, $T_{pavj}$ represents the average torque produced by $j^{th}$ repeating unit before the magnet shifting, the partial average torque produced by each repeating unit is the same as each other, i.e., $T_{pavj} = T_{pav}$;

Step (f)-5, after the magnet shifting, the rotor is caused to be slightly asymmetrical, therefore, the partial average torque of each repeating unit makes a change far lower than value of torque ripple, the specific relationship being expressed as $$\begin{cases} T_{pavj} = T_{pav} + \Delta T_j \\ T_{prjn} = T_{pm} + \Delta T_{rj} \end{cases} \text{where}$$

$$\begin{cases} \Delta T = \frac{q}{2} \sum_{j=1}^{2} \Delta T_j + \frac{q}{2} \sum_{j=1}^{2} \sum_{n=1}^{\infty} \Delta T_{rj} \sin N_{ps} n(\alpha + (j-1)\theta) \\ T_r = \frac{q}{2} \sum_{j=1}^{2} \sum_{n=1}^{\infty} T_{pm} \sin N_{ps} n(\alpha + (j-1)\theta) \end{cases}$$

$T_r$ is the main component of the torque ripple, which is recognized as the main study object by using the trigonometric function formula simplified as $$T_r = \frac{q}{2} \sum_{n=1}^{\infty} T_{pm} \frac{\sin N_{ps} n\theta}{\sin \frac{N_{ps} n\theta}{2}} \sin\left(N_{ps} n\left(\alpha + \frac{3}{2}\theta\right)\right);$$

Step (f)-6, in order to reduce torque ripple, $T_r$ is minimized, then, the shifting angle is $$\theta_n = \frac{180°}{nN_{ps}} \text{ or } \theta_n = \frac{\pi}{nN_{ps}},$$

where $\theta_n$ represents the shifting angle that eliminates the $n^{th}$ main subharmonic of the torque ripple, when n=1, magnet shifting by $\theta_1$ degrees reduces the first main harmonic of the torque ripple, and when n=2, magnet shifting by $\theta_2$ degrees reduces the second main harmonic of the torque ripple.

19. The method according to claim 11, wherein the first magnet shifting in Step (f) has the selected basic repeating unit alternately shifted by $\theta_1$ degrees.

20. The method according to claim 11, wherein the second magnet shifting in Step (g) has the shifted basic repeating unit and the adjacent fixed basic repeating unit chosen as one new repeating unit, wherein for every pair of adjacent new repeating units, one new repeating unit is fixed, and the other new repeating unit is alternately shifted by $\theta_2$ degrees, and wherein the second magnet shifting in Step (g) keeps the same shifting direction as the first magnet shifting in Step (f).

* * * * *